Aug. 12, 1952   H. L. SPECHT   2,606,791
ROLLER SKATE WHEEL
Filed Feb. 12, 1948

INVENTOR.
HAROLD L. SPECHT
BY
William Isler
ATTORNEY

Patented Aug. 12, 1952

2,606,791

UNITED STATES PATENT OFFICE 2,606,791

ROLLER SKATE WHEEL

Harold L. Specht, Parma, Ohio

Application February 12, 1948, Serial No. 7,932

4 Claims. (Cl. 301—5.7)

This invention relates generally to roller skates and more particularly to a lubricating cap or device for the wheels of roller skates.

The primary object of my invention is to provide an improved structure for maintaining the roller skate wheels properly lubricated.

Another object of my invention is to provide a cap for the skate wheel, which will prevent the lubricant from leaking out of the skate wheel and which will also improve the appearance of the skate.

Still another object of my invention is to provide means for quickly replacing or removing the aforementioned cap.

Other objects and advantages of my invention will become apparent during the course of the following description.

In the accompanying drawings, forming a part of this specification, and in which like numerals designate like parts throughout the same, Fig. 1 is a perspective view of a roller skate wheel embodying the features of my invention.

Figure 1:
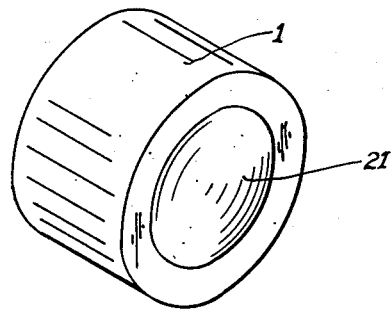
Figure 6:
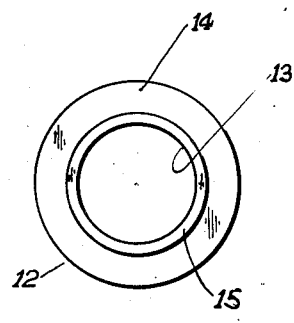
Fig. 6 is a plan view of the lubricating ring utilized in my invention.
Figures 2, 3:
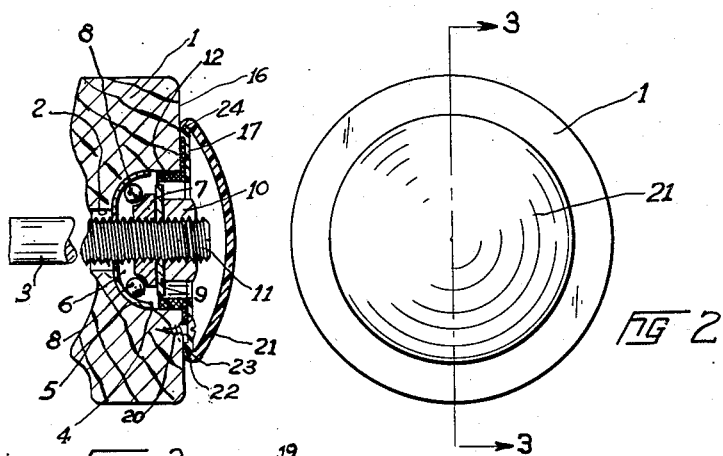
Fig. 2 is a side elevational view of the wheel shown in Fig. 1.
Fig. 3 is a cross-sectional view taken on line 3—3 of Fig. 2.
Figures 4, 5:
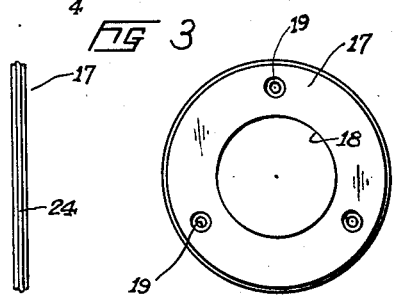
Fig. 4 is an end elevational view of the retainer ring utilized in my invention.
Fig. 5 is a plan view of the ring shown in Fig. 4.

Referring more particularly to Figs. 1 to 5 inclusive of the drawings, it will be seen that the skate wheel 1 is provided with an axially extending bore 2, whereby it is rotatably mounted on an axle 3.

The wheel 1 is counterbored to form a recess 4 which is adapted to receive an outer race ring 5 forming part of an anti-friction bearing assembly, designated broadly by the numeral 6. An inner race 7 is slidably mounted on the axle 3, and interposed between the inner and outer races are balls 8 which complete the bearing assembly.

A lock washer 9 and a nut 10 are secured to the end of shaft 3, the shaft being threaded as at 11 to receive the nut 10. The nut may be adjusted to maintain the wheel and the bearing in proper alignment, each with the other.

In order to properly lubricate the bearing assembly 6, I have provided a lubricating ring 12 which may be formed of felt, fiber, or other suitable lubricant retaining material. The ring 12 has a central opening 13, a circumferential flange portion 14 which lies against a face 16 of the wheel 1, and an annular portion 15, which extends into the recess 4 and lies against the outer bearing race 5.

The ring 12 is impregnated with a low-melting lubricant, which will slowly liquefy and flow into the bearing assembly 6 as the bearing becomes heated through rapid rotation of the wheel 1. The lubricating medium selected is one which will liquefy in the range of 100-125 degrees F.

The lubricating ring 12 is held in place on the wheel 1 by a retainer ring 17 which is provided with a central opening 18 and a plurality of circumferentially-spaced openings 19. The retainer ring 17 overlies the flange 14 of the ring 12, and is secured to the wheel 1 by means of screws 20 which extend through the openings 19. The flange 14 is thereby securely clamped in position between the face 16 of the wheel and the retainer ring 17. If desired, however, other means of securing the retainer ring 17 to the wheel may be employed, as for example, pins, rivets, spot-welding, etc.

In order to protect the bearing assembly against the entrance of foreign matter and, further, to prevent the lubricant from being whirled out, a cap 21 is utilized to shield the bearing assembly. The cap 21 may be of any suitable form, but it is preferable that it be pleasing in appearance and therefore I have shown it as spherical in contour. The cap 21 is provided with a circumferential flange 22 in which is formed a circumferential groove 23. The ring 17 is provided with a circumferential bead 24 which is complementary to the groove 23 and is adapted to fit therein. In assembling the cap 21 to the wheel, the cap is snapped over the ring 17, being retained thereon by the aforementioned bead 24.

The cap 21, as well as the retainer ring 17, the lubricating ring 12 and the outer race 5, rotate with the wheel 1 as it revolves about the axle 3.

The cap 21 will prevent the lubricant from splattering out and will prevent dust and other foreign matter from entering the bearing assembly 6. The cap will also help to prevent damage to the end of the axle 3 as well as protecting the wearer of the skates and bystanders against injury which might be caused by the sharp end of the axle in the event of spills or falls.

As previously mentioned, the low-melting lubricant, with which the lubricating ring 12 is impregnated, will lubricate the bearing assembly 6 when the temperature of the bearing assembly increases due to rapid rotation of the wheel 1. Thereby, the lubricant will be supplied only when needed, and without attention from the wearer of the skates. When the lubricant is exhausted, the ring 12 may be easily and economically replaced or it may be revitalized by again impregnating it with lubricant.

It will be noted that the cap 21 is readily removable to permit access to and inspection of the various parts of the wheel assembly and that no tools are required for its removal or replacement.

Figures 7, 8:
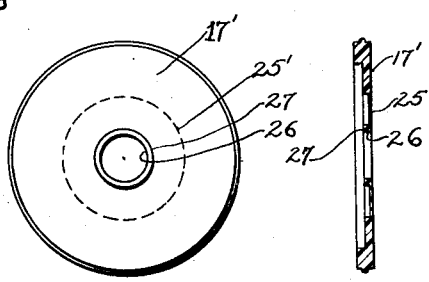
Fig. 7 is a view similar to Fig. 5, but showing a modified form of retainer ring.
Fig. 8 is a transverse cross-sectional view of the ring of Fig. 7.

Referring to Figs. 7 and 8, I have shown therein a modified form or retainer ring 17', which is similar in all respects to the ring 17, but is formed with an integral central or web portion 25 provided with a central opening 26. The web portion 25 is considerably thinner than the portion of the ring which surrounds it, while the portion of the web immediately surrounding the opening 26 is thickened, as at 27. This construction of the retainer ring is designed to facilitate proper positioning or centering of the ring, and consequently the cap 21, wth respect to the skate wheel.

In attaching the ring 17' to the skate wheel, the ring is passed over the axle 3 as by causing the end of the axle to enter the opening 26, thereby properly centering the ring. Thereafter, the thinned web portion 25, including the portion 27, is broken off, in any desired manner, and is removed. The ring 17' is then secured to the wheel in the same manner as the ring 17.

The ring 17 may also be properly centered with respect to the wheel, as by inserting a bushing in the opening 18 thereof, said bushing having a central opening of approximately the same diameter as the axle 3. The bushing is then placed over the end of the axle, with the end of the axle extending into or through the central opening in the bushing. This centers the ring properly with respect to the wheel. The ring is then attached to the wheel by means already described, after which the bushing is removed.

It is to be understood that the devices, as herein described, may be used either as original equipment or installation for new skates, or may be incorporated in existing skates as accessories.

It is to be understood that the form of my invention, herein shown and described, represents a preferred example of the same, and that various changes in the shape, size and arrangement of parts may be resorted to, without departing from the spirit of the invention or the scope of the subjoined claims.

Having thus described my invention, I claim:

1. In a roller skate, the combination of an axle, a wheel rotatably mounted on said axle, said wheel having a bearing recess therein, a bearing assembly disposed within said recess in operative association with said wheel and said axle, a lubricant retaining element disposed within said recess in lubricating relationship to said bearing assembly, a retaining ring secured to said wheel in juxtaposition to said lubricant retaining element whereby to maintain said element against displacement, and a closure adapted to overlie said recess, said closure being frictionally secured to said retaining ring.

2. A combination, as defined in claim 1, in which said retaining ring has means associated therewith for facilitating centering of the ring with respect to the wheel.

3. A combination, as defined in claim 2, in which said means comprises a thin web portion formed integrally with the ring and having a central opening therein.

4. In a roller skate with the structure described in claim 1, said retaining ring having means comprising a removable bushing, with a central opening, associated therewith for facilitating centering of the ring with respect to the wheel.

HAROLD L. SPECHT.

REFERENCES CITED

The following references are of record in the file of this patent:

UNITED STATES PATENTS

| Number | Name | Date |
| --- | --- | --- |
| 582,824 | Leavenworth | May 18, 1897 |
| 786,222 | Klamborowski | Mar. 28, 1905 |
| 898,448 | Domville | Sept. 15, 1908 |
| 1,097,921 | Faul | May 26, 1914 |
| 1,705,281 | Bott | Mar. 12, 1929 |
| 2,253,327 | Delaval-Crow | Aug. 19, 1941 |
| 2,340,648 | Daniel | Feb. 1, 1944 |